United States Patent [19]
Hornburg et al.

[11] Patent Number: 5,981,096
[45] Date of Patent: Nov. 9, 1999

[54] FUEL CELL SYSTEM

[75] Inventors: Gerald Hornburg, Elchingen; Arnold Lamm, Elchingen/Thalfingen; Peter Urban, Ulm, all of Germany

[73] Assignee: DaimlerChrysler AG, Germany

[21] Appl. No.: 09/008,831

[22] Filed: Jan. 20, 1998

[30] Foreign Application Priority Data

Jan. 17, 1997 [DE] Germany .......................... 197 01 560

[51] Int. Cl.[6] .................................................. H01M 8/04
[52] U.S. Cl. .................................................. 429/17
[58] Field of Search .............................. 429/12, 13, 17, 429/19, 20, 22, 24, 26

[56] References Cited

U.S. PATENT DOCUMENTS

| 4,810,597 | 3/1989 | Kumagai et al. . |
| 4,828,941 | 5/1989 | Sterzel . |
| 5,573,866 | 11/1996 | Van Die et al. . |
| 5,780,179 | 6/1996 | Okamoto ................................. 429/20 |

FOREIGN PATENT DOCUMENTS

| 0 693 793 A1 | 6/1995 | European Pat. Off. . |
| 35 08 153 A1 | 3/1985 | Germany . |
| 26 31 132 C2 | 8/1985 | Germany . |
| 35 08 153 C2 | 7/1987 | Germany . |
| 48 18 818 A1 | 12/1994 | Germany . |
| 57019973 | 2/1980 | Japan . |
| 56097972 | 8/1981 | Japan . |
| 56118273 | 9/1981 | Japan . |
| 56118274 | 9/1981 | Japan . |
| 57196479 | 12/1982 | Japan . |
| 58016471 | 2/1983 | Japan . |
| 04229957 | 4/1992 | Japan . |
| 1 263 544 | 2/1972 | United Kingdom . |
| WO 96/12317 | 4/1996 | WIPO . |

Primary Examiner—Maria Nuzzolillo
Assistant Examiner—Susy Tsang
Attorney, Agent, or Firm—Evenson, McKeown, Edwards & Lenahan, P.L.L.C.

[57] ABSTRACT

A fuel cell system has an anode space and a cathode space which are separated from one another by a proton-conducting membrane, and an oxygen-containing gas flows through the cathode space. According to the invention, it is suggested to admit to the anode space a liquid fuel/coolant mixture, preferably a methanol/water mixture. By means of this combination of the fuel circulation and the coolant circulation, the system can be manufactured in a more compact and lower-cost manner.

10 Claims, 1 Drawing Sheet

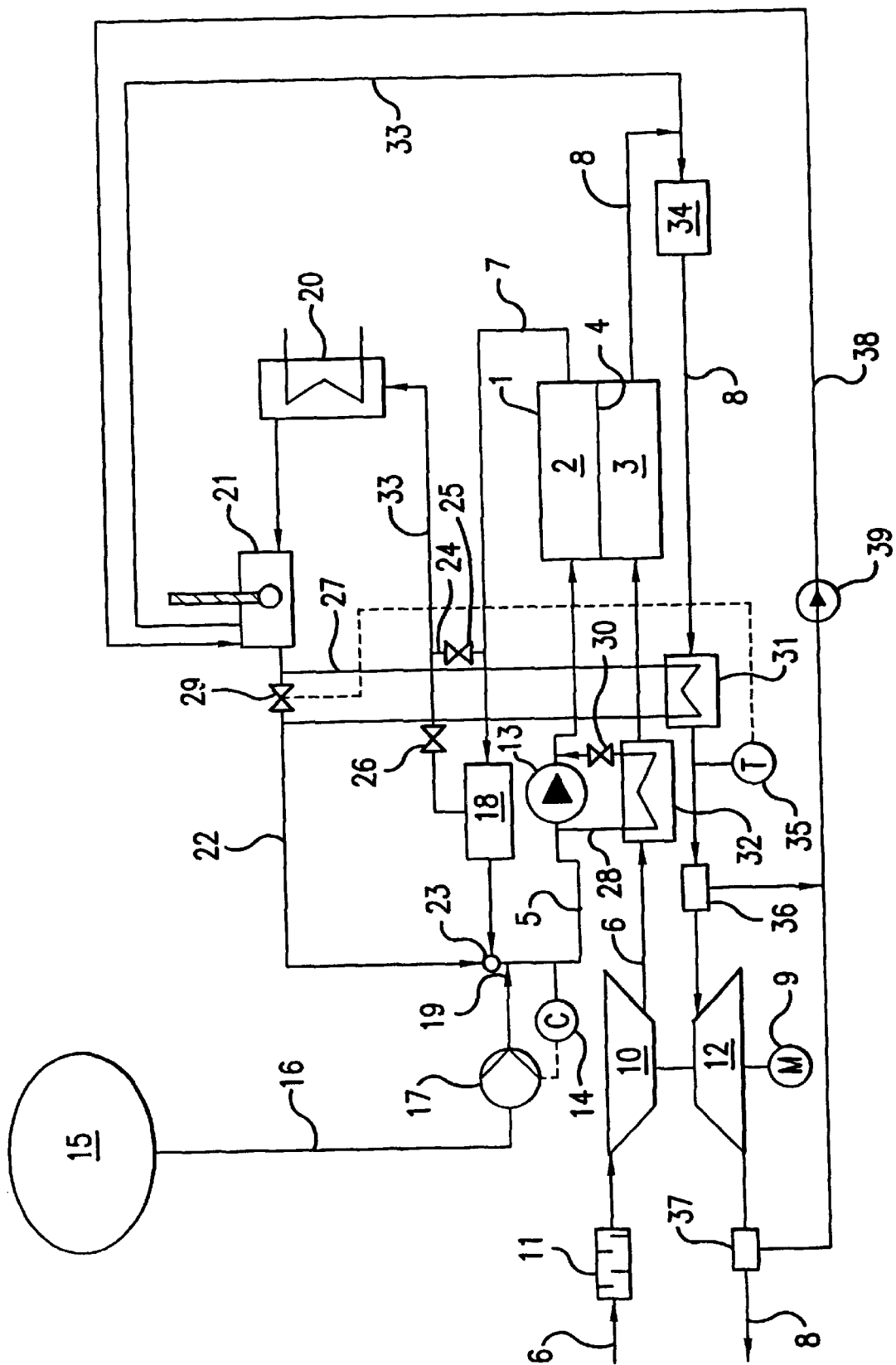

FUEL CELL SYSTEM

BACKGROUND AND SUMMARY OF THE INVENTION

This application claims the priority of 197 01 560.3, the disclosure of which is expressly incorporated by reference herein.

The invention relates to a fuel cell system having an anode space and a cathode space which are separated from one another by a proton-conducting membrane.

Currently, for energizing liquid energy carriers in a fuel cell system with a proton exchanger membrane (PEM fuel cell), the emphasis worldwide is on the reforming of methanol in a gas generating system. In this case, the water/methanol mixture is evaporated and is converted in a reformer to hydrogen, carbon dioxide and carbon monoxide. The evaporation and the reforming processes, however, require high energy expenditures, resulting in losses of energy efficiency for the overall system. Furthermore, gas processing steps are required to purify the reforming gas, which is then fed to the PEM fuel cell system.

Another problem with this approach is the use of water for reforming, because the water produced on the cathode side is not sufficient to cover the water requirements, and a separate water tank is therefore necessary.

A methanol/air fuel cell with a $CO_2$-permeable, anion-conducting membrane is disclosed in U.S. Pat. No. 4,828,941. Moreover, International Patent Document WO 96/12317 A1, discloses a fuel cell system of the above-mentioned type in which a liquid methanol/water mixture is fed to an anode space. A pipe is provided for recirculation of the methanol/water mixture, with a gas separator provided in the pipe for separating $CO_2$ formed in the anode space. However, together with the $CO_2$, methanol vapor is also separated at the same time, which reduces the efficiency.

It is an object of the present invention to provide a fuel cell system having a proton-conducting membrane with an improved overall efficiency, which has a simple construction, is compact and is operated by a liquid fuel/coolant mixture.

This and other objects and advantages are achieved by the fuel cell system according to the invention, in which an anode space and a cathode space are separated from one another by a proton-conducting membrane. A cathode feed pipe feeds oxygen-containing gas to the cathode space and an anode feed pipe feeds a liquid fuel/coolant mixture to the anode space. A return pipe is provided between the anode space output and the anode feed pipe, and a first gas separator with an outlet pipe for removing separated gas is arranged in the return pipe. A cooler and a second gas separator are successively arranged in the flow direction in the outlet pipe. A controllable bypass pipe is provided which connects the return pipe upstream of the first gas separator with the outlet pipe, between the first gas separator and the cooler. The second gas separator for removing the liquid constituents is connected with the anode feed pipe by way of a pipe.

The return of the gas-free hot anode current supplies a sufficiently high fuel cell input temperature to cause the overall efficiency of the fuel cell to rise.

The vapor separated in the first gas separator will be supplied again to the hot liquid/gas mixture in front of the cooler. Only after the cooling has taken place, will the gas be separated in a second gas separator, and supplied to the cathode exhaust gas. The gas separation at the coolest point of the system leads to a low fuel discharge by way of the inert carbon dioxide gas. The discharged fuel parts are mixed with the high-oxygen cathode exhaust gas and are converted in an exhaust gas catalyst to carbon dioxide and water vapor. As a result, the loss of efficiency can be reduced significantly since a portion of the thermal energy in the exhaust gas is regained by an expander and is transmitted to a compressor for compressing the oxygen-containing gas.

The overall system has a positive water balance since a large portion of the water vapor condenses before and after the expander acting as the condensation turbine, and the recovered water is supplied to a collecting tank or a compensation tank.

Other objects, advantages and novel features of the present invention will become apparent from the following detailed description of the invention when considered in conjunction with the accompanying drawings.

BRIEF DESCRIPTION OF THE DRAWINGS

The single FIGURE illustrates an embodiment of the fuel cell system according to the invention.

DETAILED DESCRIPTION OF THE DRAWINGS

The fuel cell 1 consists of an anode space 2 and a cathode space 3 which are separated from one another by a proton-conducting membrane 4. An anode feed pipe 5 feeds a liquid fuel/coolant mixture to the anode space 2. In this case, any substance can be used as the fuel which has the general structural formula H—[—$CH_2O$—]$_n$—Y with $1 \leq n \leq 5$ and Y=H or Y=$CH_3$, is liquid at room temperature and can be electrochemically oxidized. The system described in the embodiment uses liquid methanol as the fuel and water as the coolant. Although, in the following, only the use of a methanol/water mixture is described, the invention is not limited to this embodiment. Liquids or ionic or non-ionic additions to water with good antifreeze characteristics can also be used as coolants.

An oxygen-containing gas is conducted into the cathode space 3 by way of a cathode feed pipe 6. In this embodiment, ambient air is used for this purpose. In the fuel cell 1, the fuel is oxidized at the anode; the atmospheric oxygen is reduced at the cathode. For this purpose, the proton-conducting membrane 4 is coated on the corresponding surfaces with suitable catalysts, such as high-surface noble metal tubes or supported catalysts. From the anode side, the protons can now move through the proton-conducting membrane 4 and combine on the cathode side with the oxygen ions to form water. In this electrochemical reaction, a voltage occurs between the two electrodes. By the parallel or successive connection of many of such cells to form a so-called fuel cell stack, voltages and current intensities can be reached which are sufficient for driving a vehicle.

A carbon dioxide gas enriched with water and methanol is formed as a product at the anode output. This liquid/gas mixture is discharged from the anode space 2 by way of a return pipe 7 which is connected with the anode feed pipe 5. The cathode exhaust air, which contains residual oxygen and water vapor is discharged by way of a cathode exhaust gas pipe 8. In order to achieve a good efficiency, the ambient air in the cathode space 3 is provided with excess pressure. For this purpose, a compressor 10 is arranged in the cathode feed pipe 6 which is driven by means of an electric motor 9, and takes in the desired air flow and compresses it to the required pressure level. In addition, during the operation with ambient air, an air filter 11 is provided preferably in the inlet area of the cathode feed pipe upstream of the compressor 10. A portion of the energy required for compressing the ambient air can be recovered by means of an expander 12 arranged in the cathode exhaust pipe 8. Preferably, the compressor 101 the expander 12 and the electric motor 9 are arranged on a common shaft. Regulation of the fuel cell output is performed by controlling or regulating the rotational speed of the compressor (and thus of the available air flow).

On the anode side, the methanol/water mixture is circulated by means of a pump 13 at a defined pressure in order to constantly ensure an excess supply of fuel at the anode. The ratio of water to methanol in the anode feed pipe 5 is adjusted by means of a sensor 14 which measures the methanol concentration in the anode feed pipe 5. The concentration of the methanol/water mixture will then be controlled as a function of this sensor signal. For this purpose, liquid methanol is fed from a methanol tank 15 by way of a methanol feed pipe 16, and is injected by means of an injection nozzle 19 (not shown in detail) into the anode feed pipe 5. The injection pressure is generated by an injection pump 17 arranged in the methanol feed pipe 16. Thus a methanol/water mixture with a constant methanol concentration is continuously fed to the anode space 2.

A problem which develops on the anode side is that the carbon dioxide enriched with methanol vapor and water vapor must now be separated from the liquid/gas mixture in the return pipe 7. An excessive methanol discharge by way of the carbon dioxide gas must be prevented, because otherwise the overall efficiency of the system is reduced and simultaneously unburned methanol would be discharged into the environment. For this purpose, a two-step system is provided for the gas separation. A first gas separator 18 for separating gas from the hot liquid/gas mixture is arranged in the return pipe 7. The hot liquid is then conducted from the return pipe 7 into the anode feed pipe 5 while, by means of a pipe 33, the vapor is fed by way of a cooler 20 to a second gas separator 21. The vapor is therefore not separated until the cooling has taken place in the second gas separator 21. Thus such separation takes place at the coldest point of the system, so that the methanol discharge by way of the carbon dioxide is considerably reduced.

The methanol/water mixture remaining in the second gas separator 21 is returned into the anode feed pipe 5 by way of a pipe 22. The return of the hot methanol/water mixture from the return pipe 7 and of the cooled methanol/water mixture from the pipe 22 takes place by way of a thermostatic valve 23, by means of which the input temperature at the anode space 2 can be regulated to a defined value. The return of the hot, gas-free methanol/water mixture supplies a sufficiently high fuel cell temperature at the anode inlet, so that the overall efficiency of the fuel cell system is increased.

A bypass pipe 24 connects the return pipe 7 upstream of the first gas separator 18 with the pipe 33, and has a metering valve 25 arranged therein. By means of the bypass pipe 24, a portion of the hot liquid/gas mixture can be separated from the return pipe 7 and fed directly to the cooler 20. The vapor separated in the first gas separator 18 is then selectively fed to the liquid/gas mixture upstream of the cooler 20, by way of another metering valve 26. By means of these metering valves, the flow rates, and thus the temperature levels, in the individual branches of the anode circulating system can be influenced in a desired manner, whereby variable control or regulating processes can be implemented.

Furthermore, additional bypass pipes 27, 28, which have integrated metering valves 29, 30 and heat exchangers 31, 32, can be provided. By means of these elements, thermal energy can be transmitted as necessary, from the hot cathode exhaust air in the cathode exhaust pipe 8 to the cooled methanol/water mixture in the pipe 22 or from the hot methanol/water mixture in the anode feed pipe 5 to the cooler air flow in the cathode feed pipe 6. For this purpose, the heat exchangers 31, 32 are preferably arranged in the cathode exhaust pipe 8 between the cathode space 3 and the expander 12 or in the cathode feed pipe 6 between the compressor 10 and the cathode space 3. Furthermore, for regulating the metering valve 29, a temperature sensor 35 can be provided downstream of the heat exchanger 31 in the cathode exhaust pipe 8. By means of the heat exchanger 32, the hot charged air is preferably cooled to a temperature of down to 100° C. before entering the cathode space 3.

The gas mixture of residual methanol and carbon dioxide separated in the second gas separator 21 is conducted by way of a pipe 40 into the cathode exhaust pipe 8, where it is mixed with the high-oxygen cathode exhaust air and is converted to carbon dioxide and water vapor in an exhaust catalyst 34 arranged in the cathode exhaust gas pipe 8 downstream of the mouth of the pipe 40. In order to separate at least a portion of the water vapor as water from the cathode exhaust air, two water separators 36, 37 are arranged upstream and downstream of the expander 12 in the cathode exhaust pipe 8. The expander 12 is used as a compact condensation turbine at whose output, in turn, a portion of the water vapor condenses out.

In addition, following the exhaust gas catalyst 34, the cathode exhaust air is cooled down by means of the heat exchanger 31 described above and the temperature sensor 35 to a defined temperature level. It is only by means of this combination of temperature regulation and the condensation turbine that a positive water balance of the overall system can be ensured. The water collected in the water separators 36, 37 is then returned, by way of a return pipe 38 with an integrated return feed pump 39, into the second gas separator 21. This second gas separator thus serves simultaneously as a collecting tank for water produced on the cathode side, and as a compensating tank for the liquid methanol/water mixture. By way of a level regulating, the level of the collecting tank can be controlled and regulated.

Relative to conventional PEM fuel cell systems, this overall system has a comparable system efficiency while the construction is more compact and the costs are lower. Particularly as the result of the combination of the cooling and fuel circulating system, the volume and the costs are reduced. In addition, the overall efficiency is increased because no energy must be used for the evaporation, the overheating and the generating of fuel, and the efficiency losses as the result of the gas processing in the exhaust gas catalyst are significantly reduced. Furthermore, air moistening is not required. Additional advantages are the positive water balance and an improved cold start behavior. Finally, because of the use of a methanol/water mixture, antifreeze measures are not required.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A fuel cell system having an anode space and a cathode space which are separated from one another by a proton-conducting membrane, a cathode feed pipe for feeding oxygen-containing gas to the cathode space, an anode feed pipe for feeding a liquid fuel/coolant mixture to the anode space, a return pipe between the anode space output and the anode feed pipe, a first gas separator arranged in the return pipe with a pertaining first outlet pipe for removing separated gas and a cathode exhaust gas pipe, wherein:

a cooler and a second gas separator are successively arranged in a fluid flow direction in the first outlet pipe;

a controllable bypass pipe is provided which connects the return pipe upstream of the first gas separator with the first outlet pipe between the first gas separator and the cooler; and the second gas separator for removing the liquid constituents is connected with the anode feed pipe by way of a second outlet pipe.

2. Fuel cell system according to claim 1, wherein:

an exhaust gas catalyst is arranged in the cathode exhaust gas pipe; and the first outlet pipe leads into the cathode exhaust pipe upstream of the exhaust gas catalyst.

3. Fuel cell system according to claim 2, wherein one of a collecting tank and a compensating tank with a level regulating is integrated in the second gas separator.

4. Fuel cell system according to claim 2, wherein the return pipe and the second outlet pipe are connected with the anode feed pipe by way of a thermostatic valve.

5. Fuel cell system according to claim 1, wherein:

for feeding the liquid fuel, a fuel feeding pipe is provided between a fuel tank and the anode feed pipe;

a sensor for determining a fuel concentration is provided in the anode feed pipe downstream of a mouth of the fuel feeding pipe; and an injection pump and an injection nozzle are provided in the fuel feeding pipe for injection of fuel as a function of fuel concentration upstream of the sensor, into the anode feed pipe.

6. Fuel cell system according to claim 1, wherein a compressor/expander unit is provided between the cathode feed pipe and the cathode exhaust gas pipe.

7. Fuel cell system according to claim 1, wherein at least one of upstream and downstream of the compressor/expander unit in the cathode exhaust gas pipe, a water separator is provided which is connected with the collecting tank by way of a return feed pipe.

8. Fuel cell system according to claim 1 wherein a heat exchanger is provided between the anode feed pipe and the cathode feed pipe.

9. Fuel cell system according to claim 1 wherein a heat exchanger is provided between the second outlet pipe and the cathode exhaust pipe.

10. Fuel cell system according to claim 9 wherein:

a metering valve is arranged in the second outlet pipe;

a temperature sensor is arranged in the cathode exhaust pipe downstream of the heat exchanger; and a bypass pipe is provided which bypasses the metering valve and extends through the heat exchanger, the metering valve being controlled for adjusting the bypass flow as a function of a signal of the temperature sensor.

* * * * *